United States Patent
Sonobe (10) Patent No.: US 11,411,498 B2
(45) Date of Patent: Aug. 9, 2022

(54) CONTROLLER OF SWITCHING POWER SUPPLY APPARATUS

(71) Applicant: FUJI ELECTRIC CO., LTD., Kawasaki (JP)

(72) Inventor: Koji Sonobe, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 349 days.

(21) Appl. No.: 16/939,656

(22) Filed: Jul. 27, 2020

(65) Prior Publication Data
US 2020/0358360 A1    Nov. 12, 2020

Related U.S. Application Data

(63) Continuation of application No. PCT/JP2019/025406, filed on Jun. 26, 2019.

(30) Foreign Application Priority Data

Aug. 2, 2018 (JP) .............................. JP2018-145686

(51) Int. Cl.
H02M 3/28 (2006.01)
H02M 1/36 (2007.01)

(52) U.S. Cl.
CPC .............. *H02M 3/28* (2013.01); *H02M 1/36* (2013.01)

(58) Field of Classification Search
CPC ................................... H02M 3/28; H02M 1/36
See application file for complete search history.

(56) References Cited

U.S. PATENT DOCUMENTS

2010/0135050 A1    6/2010    Sonobe
2012/0307530 A1*  12/2012    Miyazaki .............. H02M 1/36
                                                          363/21.01
(Continued)

FOREIGN PATENT DOCUMENTS

JP    2009-189108 A    8/2009
JP    2010-110037 A    5/2010
(Continued)

OTHER PUBLICATIONS

International Search Report for PCT/JP2019/025406, dated Sep. 10, 2019.
Written Opinion for PCT/JP2019/025406, dated Sep. 10, 2019.

*Primary Examiner* — Thienvu V Tran
*Assistant Examiner* — Bart Iliya
(74) *Attorney, Agent, or Firm* — Rabin & Berdo, P.C.

(57) ABSTRACT

A controller of a current resonance switching power supply apparatus configured to supply a constant output voltage to a load. The current resonance switching power supply apparatus includes a resonance circuit, and generates a feedback signal indicative of an error between the output voltage and a target voltage. The controller includes a load current detection circuit that receives a part of a resonance current of the resonance circuit, performs averaging and outputs a load current signal, and a standby detection circuit that receives the feedback signal and the load current signal, and determines that the load is in a standby mode upon detecting that the load current signal is lower than a first threshold and the feedback signal is lower than a second threshold, and is in a normal mode upon detecting that the feedback signal continues to be higher than the second threshold for more than a predetermined time.

7 Claims, 7 Drawing Sheets

(56) References Cited

U.S. PATENT DOCUMENTS

| | | |
|---|---|---|
| 2016/0164425 A1 | 6/2016 | Chen |
| 2017/0155333 A1 | 6/2017 | Chen |
| 2017/0373604 A1 | 12/2017 | Chen |
| 2018/0041129 A1* | 2/2018 | Sugahara ................. H02M 1/08 |
| 2018/0041131 A1* | 2/2018 | Sugahara ............ H02M 3/3376 |

FOREIGN PATENT DOCUMENTS

| | | |
|---|---|---|
| JP | 2014-060895 A | 4/2014 |
| JP | 2016-111758 A | 6/2016 |
| JP | 2017-103889 A | 6/2017 |
| JP | 2017-229209 A | 12/2017 |

\* cited by examiner

CONTROLLER OF SWITCHING POWER SUPPLY APPARATUS

CROSS-REFERENCE TO RELATED APPLICATION

This application is a continuation application of International Application PCT/JP2019/025406 filed on Jun. 26, 2019 which designated the U.S., which claims priority to Japanese Patent Application No. 2018-145686, filed on Aug. 2, 2018, the entire contents of which are incorporated herein by reference.

BACKGROUND OF THE INVENTION

1. Field of the Invention

The embodiment discussed herein relates to a controller of a switching power supply apparatus.

2. Background of the Related Art

At present, usually various pieces of electrical apparatus to which power supply is supplied by a switching power supply apparatus have normal mode in which normal operation is performed and standby mode in which a standby state arises.

The power consumption of electrical apparatus having such standby mode is low in a standby state, compared with that of the electrical apparatus which is in normal mode. Therefore, a switching power supply apparatus also detects the standby state to reduce the capability to supply power supply. By doing so, the power consumption is reduced.

By receiving from electrical apparatus which is a load a standby control signal which indicates that the electrical apparatus enters standby mode, a switching power supply apparatus determines that the electrical apparatus is in the standby mode (see, for example, Japanese Laid-open Patent Publication No. 2017-103889). With the switching power supply apparatus disclosed in Japanese Laid-open Patent Publication No. 2017-103889, for example, the standby control signal from the load is received by an output voltage detection circuit which detects an output voltage and which feeds back it to a control integrated circuit (IC). The voltage division ratio of a voltage division circuit which divides the output voltage is switched to a voltage division ratio in standby mode. By doing so, the control IC detects a change in feedback voltage caused by the standby control signal and determines that standby instructions are given by the load. As a result, the switching power supply apparatus enters the standby mode.

Furthermore, it is known that a switching power supply apparatus exercises burst control. That is to say, when the switching power supply apparatus is in standby mode, a constant switching period for which switching is performed and a constant stop period for which switching is stopped are repeated (see, for example, Japanese Laid-open Patent Publication No. 2016-111758). The standby power of the switching power supply apparatus at the time of the standby mode is significantly reduced by setting the stop period in switching operation. When switching is stopped and begun in the switching period in the burst control, a sound which depends on a resonance current at the time of switching operation being stopped or begun may be produced. That is to say, when switching is suddenly stopped or begun, a transient phenomenon in which a resonance current suddenly decreases or increases occurs. An audible noise frequency component may appear in a current flowing through a resonance circuit because of this transient phenomenon. As a resonance current increases, this audible noise frequency component increases. As a result, a sound is produced. With the switching power supply apparatus disclosed in Japanese Laid-open Patent Publication No. 2016-111758, for example, soft start operation and soft end operation are performed in intermittent switching in the burst control in order to prevent this sound from being produced.

The above switching power supply apparatus detects a change in feedback voltage and enters the standby mode. However, the switching power supply apparatus also determines on the basis of a change in feedback voltage the timing at which the switching power supply apparatus returns from the standby mode to normal mode. Response time of feedback needed for stable operation differs among different pieces of switching power supply apparatus. If response time of feedback is short, a change in feedback voltage in the standby mode is quick even at the time of a load being light. As a result, a switching power supply apparatus may erroneously return to normal mode. In this case, normal switching in which soft start operation or soft end operation is not performed is begun at the instant that the switching power supply apparatus returns to the normal mode. As a result, a transient phenomenon in which a resonance current suddenly increases occurs and an audible noise frequency component appears in a current flowing through a resonance circuit.

SUMMARY OF THE INVENTION

According to an aspect, there is provided a controller of a current resonance switching power supply apparatus configured to supply a constant output voltage to a load, the current resonance switching power supply apparatus including a resonance circuit that has a resonance current, and a feedback signal generation circuit that generates a feedback signal indicative of an error between the output voltage of the current resonance switching power supply apparatus and a target voltage. The controller includes: a load current detection circuit which receives a part of the resonance current of the resonance circuit that is proportional to a load current, performs averaging, and outputs a load current signal indicative of the load current; and a standby detection circuit which receives the feedback signal and the load current signal, and determines that the load is in a standby mode, upon detecting that the load current signal is lower than a first threshold and the feedback signal is lower than a second threshold, and in a normal mode, upon detecting that the feedback signal continues to be higher than the second threshold for more than a predetermined time.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

An embodiment will now be described in detail with reference to the accompanying drawings with a current resonance switching power supply apparatus in which a control IC determines the standby state of a load without taking instructions from the outside as an example. Components in the figures marked with the same numerals are the same.

Figure 1:
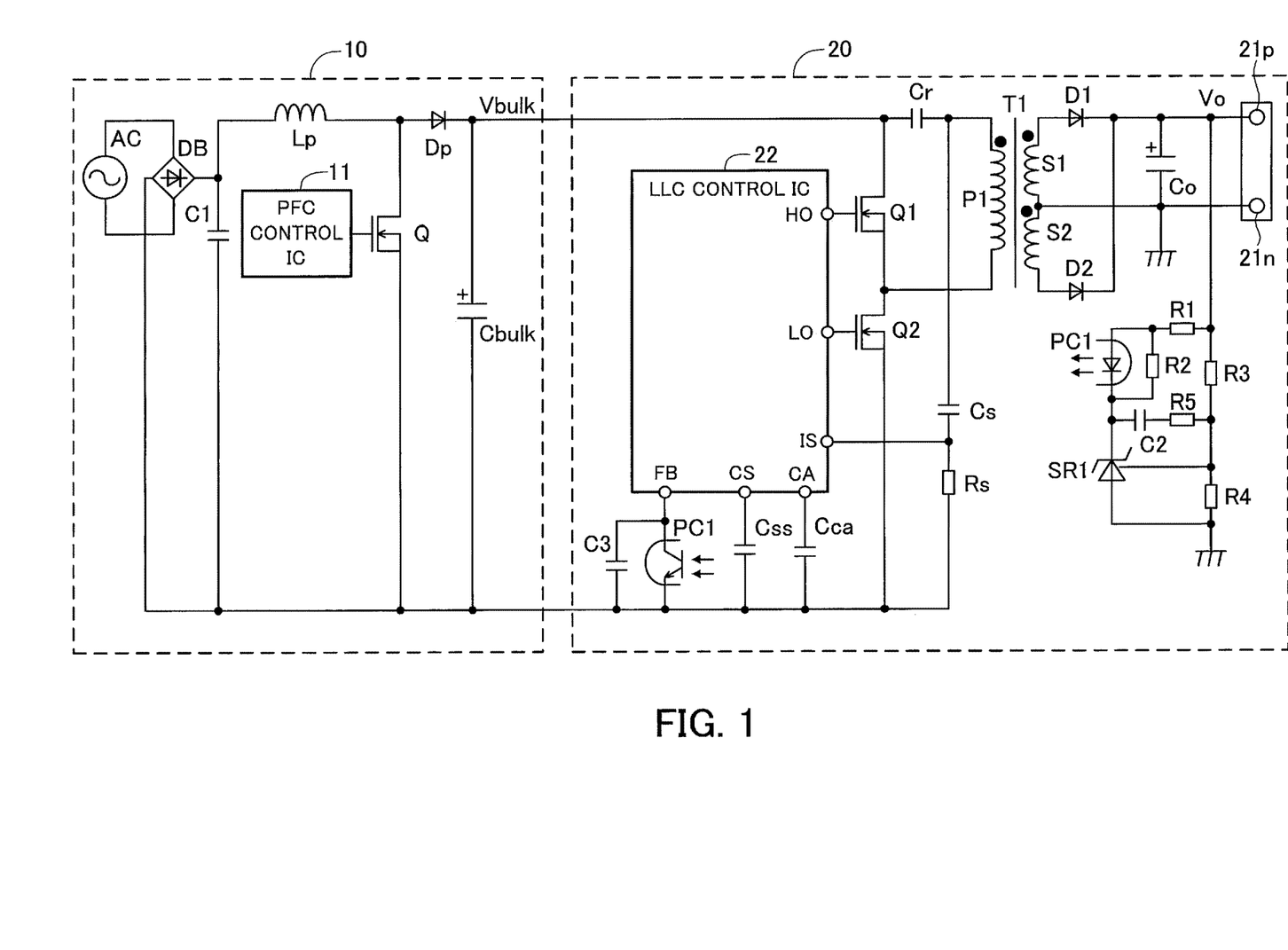
FIG. 1 is a circuit diagram illustrative of a current resonance switching power supply apparatus including a controller according to an embodiment.
Figure 2:
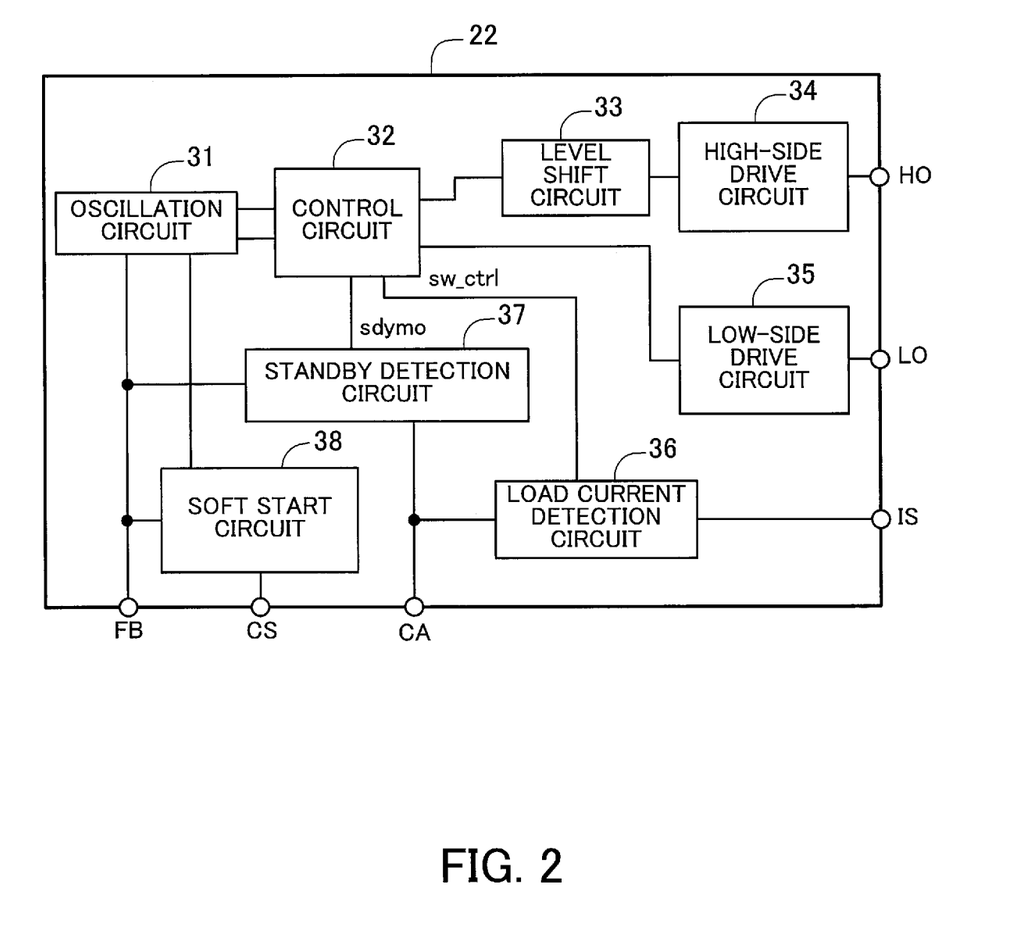
FIG. 2 illustrates an example of the structure of the controller.

FIG. 1 is a circuit diagram illustrative of a current resonance switching power supply apparatus including a controller according to an embodiment. FIG. 2 illustrates an example of the structure of the controller. In the following description the same numeral may be used for representing the name of a terminal and a voltage, a signal, or the like at the terminal.

A switching power supply apparatus illustrated in FIG. 1 includes a first converter 10 and a second converter 20 and has a two-stage structure. The first converter 10 is a power factor correction (PFC) step-up converter and the second converter 20 is a direct current(DC)-DC converter. In this example, the second converter 20 is a current resonance half bridge converter.

In the first converter 10, both terminals of an alternating-current (AC) power source AC are connected to an AC input terminal of a diode bridge DB. A positive electrode output terminal of the diode bridge DB is connected to one terminal of a smoothing capacitor C1. The other terminal of the smoothing capacitor C1 is connected to a negative electrode output terminal of the diode bridge DB. Furthermore, the positive electrode output terminal of the diode bridge DB is connected to one terminal of an inductor Lp. The other terminal of the inductor Lp is connected to an anode terminal of a diode Dp. Furthermore, the other terminal of the inductor Lp is connected to a drain terminal of a switching element Q which is an n-channel metal-oxide-semiconductor field-effect transistor (MOSFET). A gate terminal of the switching element Q is connected to an output terminal of a PFC control IC 11. A source terminal of the switching element Q is connected to the negative electrode output terminal of the diode bridge DB. A cathode terminal of the diode Dp is connected to a positive electrode terminal of a smoothing capacitor Cbulk and an output terminal of the first converter 10. A negative electrode terminal of the smoothing capacitor Cbulk is connected to the negative electrode output terminal of the diode bridge DB.

With the first converter 10, an AC input voltage from the AC power source AC is full-wave-rectified by the diode bridge DB. A pulsating current obtained is smoothed by the smoothing capacitor C1. A smoothed voltage is stepped up by a step-up circuit made up of the inductor Lp, the switching element Q, the PFC control IC 11, the diode Dp, and the smoothing capacitor Cbulk and is converted to an AC voltage stepped up. At this time the PFC control IC 11 corrects a power factor by making an average current waveform outputted from the diode Dp close to the sine wave of the AC input voltage and outputs a DC intermediate voltage Vbulk stepped up. The output terminal of the first converter 10 is an input terminal of the second converter 20.

In the second converter 20, a half bridge circuit made up of a high-side switching element Q1 and a low-side switching element Q2 connected in series is connected to two input terminals which receive the intermediate voltage Vbulk. In the example of FIG. 1, an n-channel MOSFET is used as each of the switching elements Q1 and Q2. However, a switching element of another type, such as an insulated gate bipolar transistor (IGBT), may be used.

The common connection point of the switching elements Q1 and Q2 is connected to one end of a primary winding P1 of a transformer T1 and the other end of the primary winding P1 is connected via a resonance capacitor Cr to a drain terminal of the switching element Q1. The magnetizing inductance of the primary winding P1 of the transformer T1, leakage inductance between the primary winding P1 and secondary windings S1 and S2 of the transformer T1 and the resonance capacitor Cr make up a resonance circuit. In this embodiment the resonance circuit is connected in parallel with the switching element Q1. However, the resonance circuit may be connected in parallel with the switching element Q2. An equivalent circuit of the resonance circuit is represented as a series circuit including the resonance capacitor Cr, the leakage inductance, and the magnetizing inductance of the primary winding P1 of the transformer T1. In some cases, the magnetizing inductance of the primary winding P1 of the transformer T1 is included in a resonance reactor of the resonance circuit. In some cases, however, the magnetizing inductance of the primary winding P1 of the transformer T1 is not included in a resonance reactor of the resonance circuit. This depends on operation mode. Furthermore, leakage inductance is not utilized and a reactor other than a transformer may be connected as a resonance reactor in series with the resonance capacitor Cr.

One end of the secondary winding S1 of the transformer T1 is connected to an anode terminal of a diode D1. One end of the secondary winding S2 of the transformer T1 is connected to an anode terminal of a diode D2. Cathode terminals of the diodes D1 and D2 are connected to a positive electrode terminal of an output capacitor Co and an output terminal 21p. A negative electrode terminal of the output capacitor Co is connected to the common connection point of the secondary windings S1 and S2, an output terminal 21n, and ground. The secondary windings S1 and S2, the diodes D1 and D2, and the output capacitor Co make up a circuit which rectifies and smooths an AC voltage generated in the secondary windings S1 and S2 and which converts it to a DC voltage. This circuit is an output circuit of the switching power supply apparatus. The output terminals 21p and 21n are connected to a load (not illustrated).

The output terminal 21p is connected via a resistor R1 to an anode terminal of a light-emitting diode of a photocoupler PC1. A cathode terminal of the light-emitting diode is connected to a cathode terminal of a shunt regulator SR1. A resistor R2 is connected between the anode terminal and the cathode terminal of the light-emitting diode in parallel therewith. An anode terminal of the shunt regulator SR1 is connected to the ground. The shunt regulator SR1 has a reference terminal connected to the connection point of resistors R3 and R4 connected in series between the positive electrode terminal of the output capacitor Co and the ground.

A circuit made up of a resistor R5 and a capacitor C2 connected in series is connected between the reference terminal and the cathode terminal of the shunt regulator SR1. The shunt regulator SR1 causes a current corresponding to the difference between an internal reference voltage and a voltage obtained by dividing an output voltage Vo (voltage across the output capacitor Co) to flow to the light-emitting diode. A collector terminal of a phototransistor of the photocoupler PC1 is connected to an FB terminal of an LLC control IC 22 which is a controller of the second converter 20. An emitter terminal of the phototransistor is connected to the ground. A capacitor C3 is connected between the collector terminal and the emitter terminal of the phototransistor. The photocoupler PC1 and the shunt regulator SR1 make up a circuit ("the feedback signal generation circuit") which feeds back an error between the output voltage Vo and the reference voltage to the LLC control IC 22.

Furthermore, the LLC control IC 22 has an HO terminal connected to a gate terminal of the high-side switching element Q1, an LO terminal connected to a gate terminal of the low-side switching element Q2, an IS terminal, a CA terminal, and a CS terminal. The IS terminal is connected to the common connection point of a capacitor Cs and a resistor Rs which make up a series circuit. The series circuit made up of the capacitor Cs and the resistor Rs is connected AC-wise in parallel with the resonance capacitor Cr and is a shunt circuit which shunts a resonance current. A current shunted by this shunt circuit is converted to a voltage signal by the current detection resister Rs and is inputted to the IS terminal of the LLC control IC 22 as the resonance current, that is to say, as a signal indicative of a load current. One end of a capacitor Cca is connected to the CA terminal and the other end of the capacitor Cca is connected to the ground. One end of a capacitor Css is connected to the CS terminal and the other end of the capacitor Css is connected to the ground.

In the LLC control IC 22, as illustrated in FIG. 2, the FB terminal is connected to an input terminal of an oscillation circuit 31 and an output terminal of the oscillation circuit 31 is connected to a control circuit 32. A high-side output terminal of the control circuit 32 is connected via a level shift circuit 33 to an input terminal of a high-side drive circuit 34 and a low-side output terminal of the control circuit 32 is connected to an input terminal of a low-side drive circuit 35. An output terminal of the high-side drive circuit 34 is connected to the HO terminal and an output terminal of the low-side drive circuit 35 is connected to the LO terminal. The IS terminal is connected to a first input terminal of a load current detection circuit 36 and an output terminal of the load current detection circuit 36 is connected to the CA terminal and a first input terminal of a standby detection circuit 37. A signal sw ctrl outputted from the control circuit 32 is inputted to a second input terminal of the load current detection circuit 36. A second input terminal of the standby detection circuit 37 is connected to the FB terminal and an output terminal of the standby detection circuit 37 is connected to an input terminal of the control circuit 32 from which a signal sdymo is inputted. Furthermore, the FB terminal is connected to a first input terminal of a soft start circuit 38 and a second input terminal of the soft start circuit 38 is connected to the CS terminal. An output terminal of the soft start circuit 38 is connected to the oscillation circuit 31.

With the second converter 20 a current of the photocoupler PC1 changes according to the output voltage Vo. An optical signal emitted by the light-emitting diode of the photocoupler PC1 is received by the phototransistor and becomes a feedback voltage (FB terminal voltage). The FB terminal is pulled up by a pull-up resistor (not illustrated) or the like to the high potential side in the LLC control IC 22 and a voltage at the FB terminal has a value corresponding to the output voltage Vo.

The FB terminal is connected to the oscillation circuit 31. The oscillation circuit 31 is, for example, a voltage-controlled oscillator (VCO) and outputs in normal mode a signal having an oscillation frequency corresponding to the FB terminal voltage. The oscillation circuit 31 inputs to the control circuit 32 a signal having an oscillation frequency which changes according to a change in the FB terminal voltage. On the basis of this signal, the control circuit 32 exercises control so that the output voltage Vo will become constant.

The load current detection circuit 36 is the same as a load detection circuit illustrated in FIG. 5 in Japanese Laid-open Patent Publication No. 2017-103889. A signal corresponding to a resonance current obtained from the shunt circuit made up of the capacitor Cs and the resistor Rs is received at the IS terminal. On the basis of a signal sw ctrl, the load current detection circuit 36 averages the above signal by the capacitor Cca connected to the CA terminal and outputs a signal indicative of the resonance current. Because the magnitude of the resonance current is proportional to a current supplied to the load, a signal at the CA terminal is a voltage signal indicative of a load current. This voltage signal indicative of a load current is supplied to the standby detection circuit 37.

The standby detection circuit 37 receives the signal at the CA terminal indicative of the load current and a signal at the FB terminal indicative of the output voltage Vo. When both of the load current and the output voltage Vo indicate values at standby mode time, the standby detection circuit 37 supplies a high-level signal sdymo to the control circuit 32. When the control circuit 32 receives the high-level signal sdymo from the standby detection circuit 37, the control circuit 32 switches the operation of the second converter 20 from normal mode to standby mode. When the second converter 20 enters the standby mode, the control circuit 32 exercises burst control and reduces the number of times switching is performed. By doing so, switching loss is reduced and efficiency is improved.

The soft start circuit 38 charges or discharges the capacitor Css connected to the CS terminal according to a change in FB terminal voltage for the purpose of the burst control exercised by the control circuit 32. At burst control time a voltage of the capacitor Css (voltage at the CS terminal) at charge or discharge time is inputted to the oscillation circuit 31, which is a VCO, in place of the FB terminal voltage. By doing so, soft start operation and soft end operation are performed when switching is begun and stopped in a switching period at burst control time.

Figure 3:
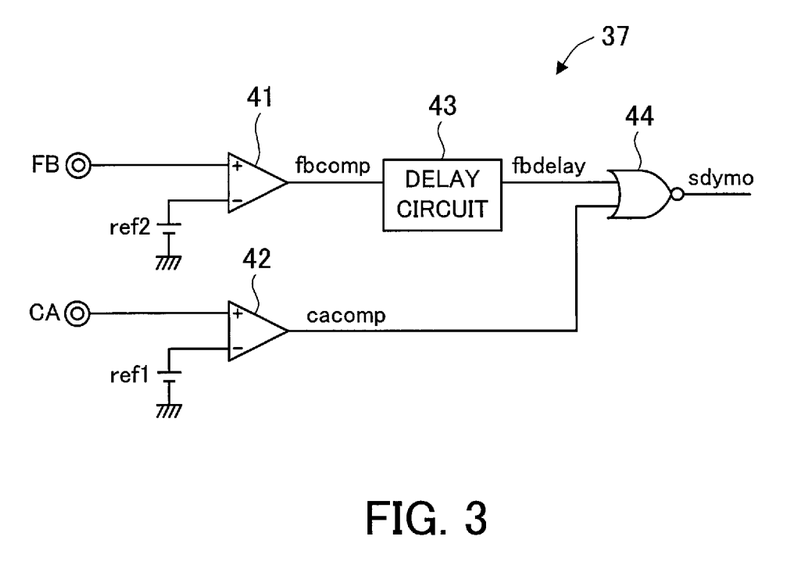
FIG. 3 is a circuit diagram illustrative of an example of the structure of a standby detection circuit.
Figure 4:
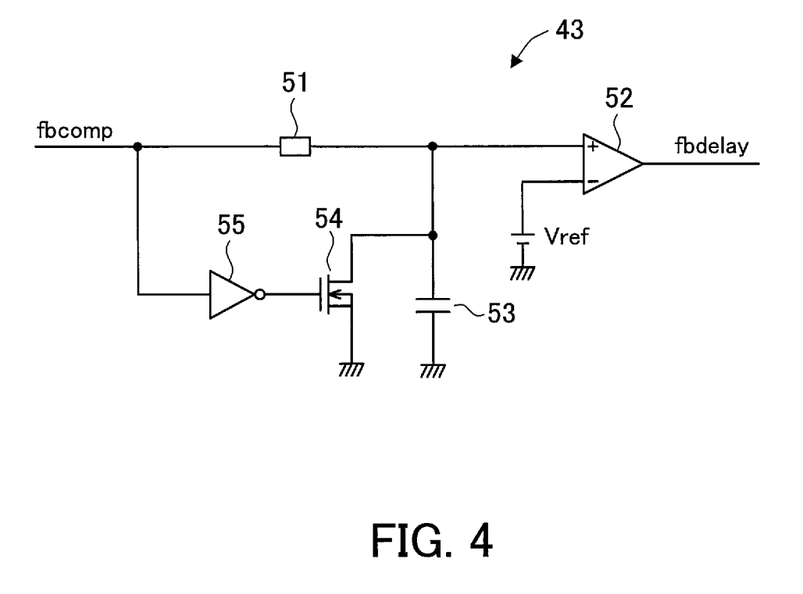
FIG. 4 is a circuit diagram illustrative of an example of the structure of a delay circuit included in the standby detection circuit.
Figure 5:
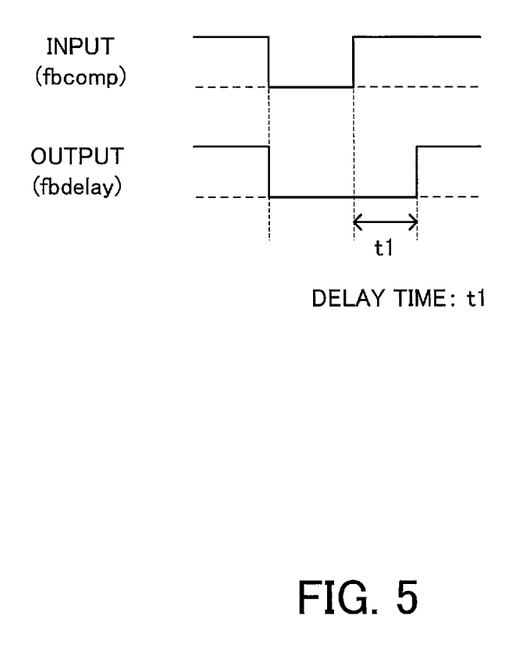
FIG. 5 illustrates input and output waveforms of the delay circuit included in the standby detection circuit.
Figure 6:
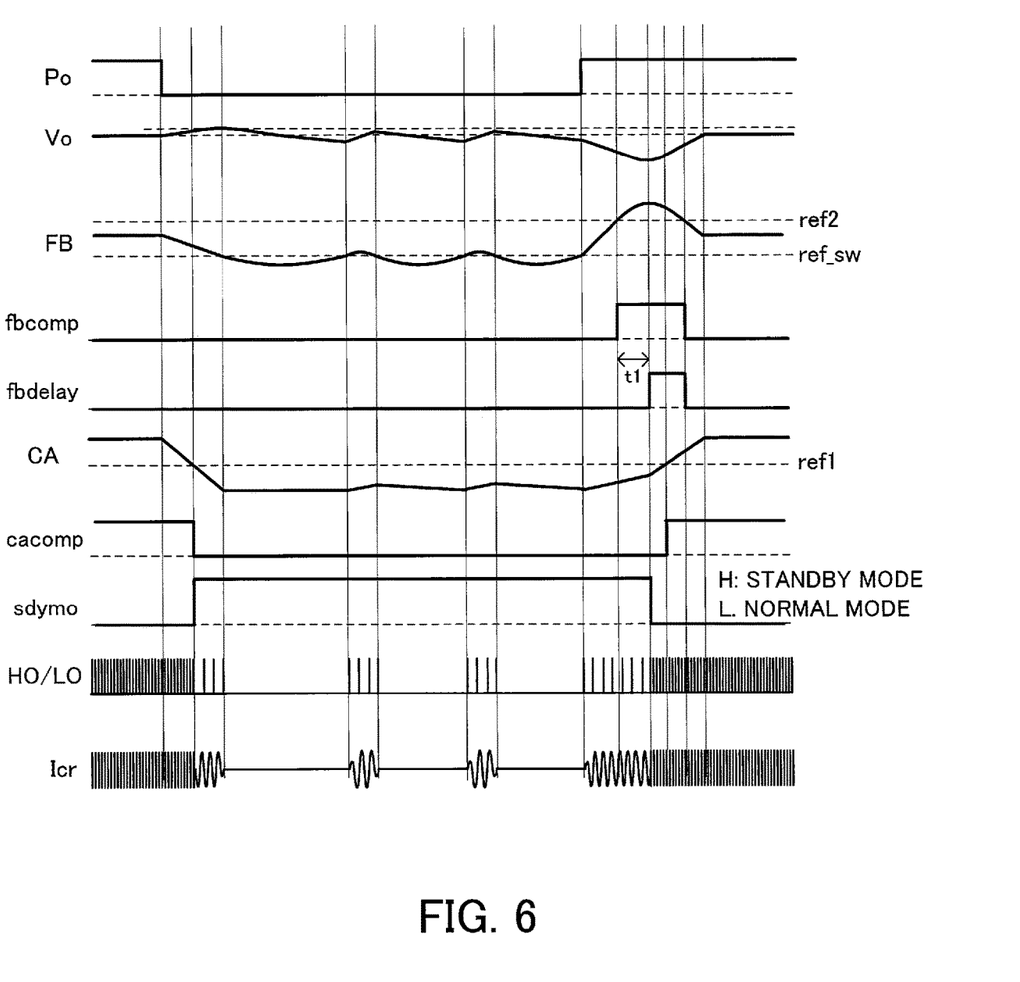
FIG. 6 illustrates the operation sequence of the standby detection circuit obtained in the case of a feedback response being slow.
Figure 7:
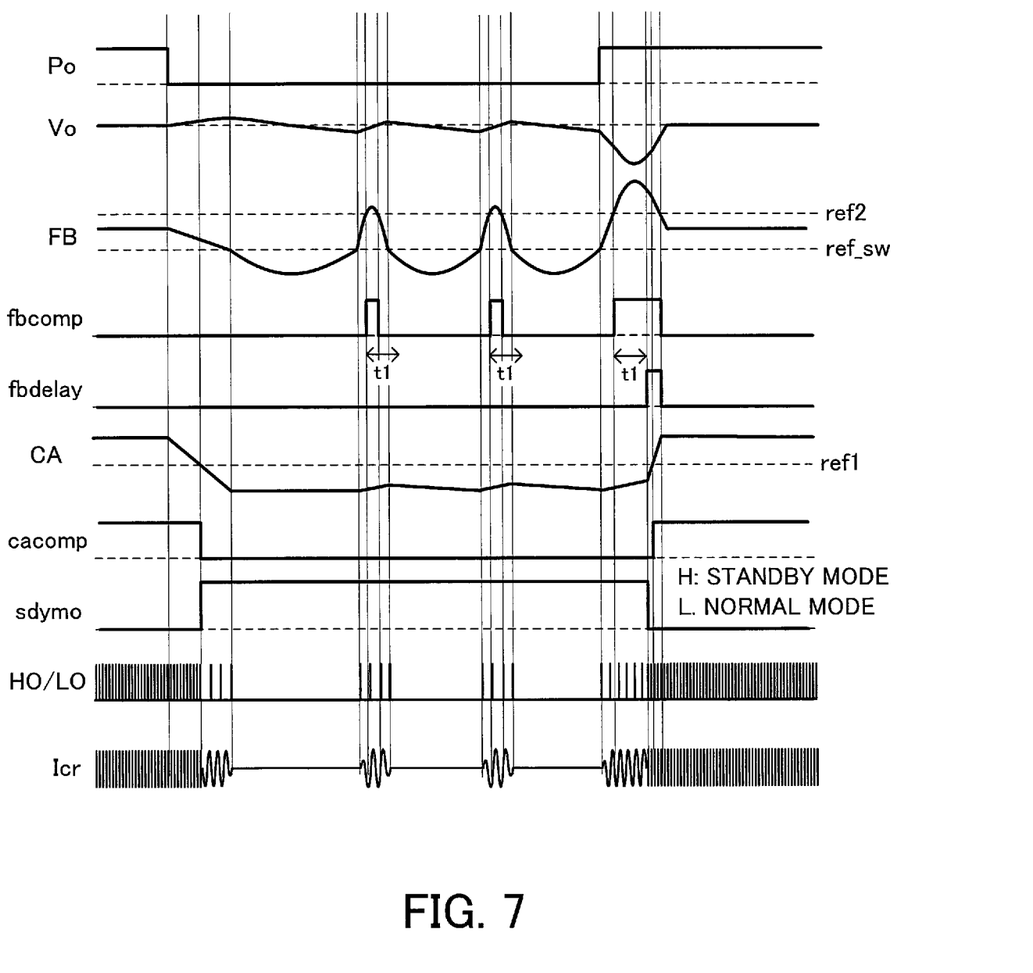
FIG. 7 illustrates the operation sequence of the standby detection circuit obtained in the case of a feedback response being quick.

FIG. 3 is a circuit diagram illustrative of an example of the structure of the standby detection circuit. FIG. 4 is a circuit diagram illustrative of an example of the structure of a delay circuit included in the standby detection circuit. FIG. 5 illustrates input and output waveforms of the delay circuit included in the standby detection circuit. FIG. 6 illustrates the operation sequence of the standby detection circuit obtained in the case of a feedback response being slow. FIG. 7 illustrates the operation sequence of the standby detection circuit obtained in the case of a feedback response being quick.

As illustrated in FIG. 3, the standby detection circuit 37 includes comparators 41 and 42, a delay circuit 43, and a NOR circuit 44. The FB terminal is connected to a non-inverting input terminal of the comparator 41. A threshold ref2 for determining the output voltage Vo is inputted to an inverting input terminal of the comparator 41. The comparator 41 outputs a signal fbcomp. The CA terminal is connected to a non-inverting input terminal of the comparator 42. A threshold ref1 for determining whether or not the load is light is inputted to an inverting input terminal of the comparator 42. The comparator 42 outputs a signal cacomp. The comparators 41 and 42 are preferably hysteresis comparators. An output terminal of the comparator 41 is connected to an input terminal of the delay circuit 43. The delay circuit 43 receives the signal fbcomp and outputs a signal fbdelay. An output terminal of the delay circuit 43 is connected to one input terminal of the NOR circuit 44. An output terminal of the comparator 42 is connected to the other input terminal of the NOR circuit 44. An output terminal of the NOR circuit 44 is an output terminal of the standby detection circuit 37. The standby detection circuit 37 outputs a signal sdymo to the control circuit 32. When the input signal fbdelay and signal cacomp are at a low level, the output signal sdymo of the NOR circuit 44 becomes a high level. In the other cases, the output signal sdymo of the NOR circuit 44 becomes a low level.

The delay circuit 43 delays the rising leading edge of an input signal and outputs it. In this case, the delay circuit 43 does not delay the falling trailing edge of the input signal. For example, the delay circuit 43 has a structure illustrated in FIG. 4.

That is to say, the input terminal of the delay circuit 43 is connected via a resistor 51 to a non-inverting input terminal of a comparator 52. One end of a capacitor 53 is connected to the connection point of the resistor 51 and the non-inverting input terminal of the comparator 52 and the other end of the capacitor 53 is connected to the ground. A switching element 54 is connected to both ends of the capacitor 53 in parallel therewith. In this embodiment an n-channel MOSFET is used as the switching element 54. The one end of the capacitor is connected to a drain terminal of the switching element 54 and a source terminal of the switching element is connected to the ground. Furthermore, the input terminal of the delay circuit 43 is connected to an input terminal of an inverter circuit 55 and an output terminal of the inverter circuit 55 is connected to a gate terminal of the switching element 54. In addition, a reference voltage Vref which is a threshold is inputted to an inverting input terminal of the comparator 52. Delay time is determined by a time constant which depends on the resistor 51 and the capacitor 53 and the reference voltage Vref.

As illustrated in FIG. 5, when a low-level signal fbcomp is inputted to the input terminal of the delay circuit 43, an output of the inverter circuit 55 becomes a high level. As a result, the switching element is turned on and electric charges stored in the capacitor 53 are discharged. Accordingly, the comparator 52 outputs a low-level signal fbdelay.

Next, when a high-level signal fbcomp is inputted to the input terminal of the delay circuit 43, an output of the inverter circuit 55 becomes a low level. As a result, the switching element 54 is turned off and the capacitor 53 is charged by the high-level signal fbcomp inputted via the resistor 51. A terminal voltage of the capacitor 53 gradually rises and exceeds the reference voltage Vref after the elapse of determined time. At this time the comparator 52 outputs a high-level signal fbdelay with a delay of t1 after the input of the high-level signal fbcomp.

Next, when a low-level signal fbcomp is inputted to the input terminal of the delay circuit 43, an output of the inverter circuit 55 becomes a high level. As a result, the switching element 54 is turned on and electric charges stored in the capacitor 53 are discharged momentarily. Accordingly, the comparator 52 outputs a low-level signal fbdelay without delay at the timing at which the electric charges stored in the capacitor 53 are discharged.

The operation of the standby detection circuit 37 will now be described by reference to FIGS. 6 and 7. In FIGS. 6 and 7, the power Po of the load, the output voltage Vo, the FB terminal voltage, the signals fbcomp and fbdelay which the delay circuit 43 receives and outputs respectively, the CA terminal voltage, the signal cacomp which the comparator 42 outputs, the signal sdymo which indicates whether or not the load is in standby mode, signals at the HO terminal and the LO terminal, and a change in the resonance current Icr are indicated from the top. A threshold voltage ref_sw compared with the FB terminal voltage is used by the soft start circuit 38 for performing switching in burst control in the standby mode between a constant switching period for which switching is performed and a constant stop period for which switching is stopped.

In the description of the operation of the standby detection circuit 37, the following case is taken as an example. When the load shifts from normal mode to standby mode and then returns to the normal mode, the second converter 20 changes from normal mode to standby mode and changes from the standby mode to the normal mode. The power Po of the load is at first high in the normal mode in which all the functions of the load operate. After that, the power Po of the load becomes low in the standby mode in which only part of the load functions. When finally the load returns to the normal mode, the power Po of the load becomes high again.

Furthermore, as illustrated in FIG. 6, if a feedback response is slow, then a change in the FB terminal voltage relative to a change in the output voltage Vo is small. As illustrated in FIG. 7, if a feedback response is quick, then a change in the FB terminal voltage relative to a change in the output voltage Vo is great.

First, it is assumed that when the load operates in the normal mode, the output voltage Vo of the second converter 20 is a target voltage and the FB terminal voltage is between the threshold voltage ref_sw and the threshold ref2. At this time, the signal fbcomp outputted by the comparator 41 in the standby detection circuit 37 is at a low level and the signal fbdelay outputted by the delay circuit 43 in the standby detection circuit 37 is also at a low level. Because a load current is strong in the normal mode, the CA terminal voltage is kept high. Accordingly, the signal cacomp outputted by the comparator 42 is at a high level. Because the signal fbdelay is at the low level and the signal cacomp is at the high level, the signal sdymo outputted by the NOR circuit 44 is at a low level. At this time a pulse signal having a frequency corresponding to the FB terminal voltage is outputted to the HO terminal and the LO terminal. The resonance current Icr is a sine-wave current.

Next, when the load shifts to the standby mode and the power Po of the load decreases to standby power, the amount of electric charges flowing from the output capacitor Co to the load decreases and the output voltage Vo rises. As a result, the FB terminal voltage falls. At this time the CA terminal voltage also falls. When the CA terminal voltage falls below the threshold ref1, the comparator 42 in the standby detection circuit 37 outputs a low-level signal cacomp. At this time the signal fbdelay outputted by the delay circuit 43 is also at the low level. Accordingly, the NOR circuit 44 outputs a high-level signal sdymo. When the high-level signal sdymo is inputted to the control circuit 32, the control circuit 32 changes from the normal mode to the standby mode and changes a switching frequency to a frequency in the standby mode. As a result, a pulse signal having the frequency in the standby mode is outputted to the HO terminal of the high-side drive circuit 34 and the LO terminal of the low-side drive circuit 35.

Burst control in which a switching period and a switching stop period are repeated is exercised for a period for which the second converter 20 is in the standby mode. The soft start circuit 38 sets a period for which the FB terminal voltage is higher than the threshold voltage ref_sw as the switching period and sets a period for which the FB terminal voltage is lower than the threshold voltage ref_sw as the switching stop period. The oscillation circuit 31 prevents an excessive overshoot and undershoot at the time of the beginning and end of the switching period. As stated above, a switching frequency in the switching period is determined by a voltage of the capacitor Css at charge or discharge time.

As illustrated in FIG. 6, if a feedback response is slow in the period for which the second converter 20 is in the standby mode, then the FB terminal voltage does not reach the threshold ref2. Accordingly, the comparator 41 in the standby detection circuit 37 outputs a low-level signal fbcomp. On the other hand, as illustrated in FIG. 7, if a feedback response is quick, then the FB terminal voltage reaches the threshold ref2. Accordingly, the comparator 41 outputs a high-level signal fbcomp for a period for which the FB terminal voltage is higher than the threshold ref2. When the comparator 41 outputs the high-level signal fbcomp, the switching element 54 in the delay circuit 43 is turned off. As a result, charging the capacitor 53 by the signal fbcomp is begun. However, the period for which the FB terminal voltage is higher than the threshold ref2 is shorter than the delay time t1 and the capacitor 53 is discharged at the timing at which the FB terminal voltage falls below the threshold ref2. Accordingly, the delay circuit 43 does not output a high-level signal fbdelay. That is to say, there is need for the second converter 20 to be in the standby mode. Even when the FB terminal voltage temporarily exceeds the threshold ref2, erroneously returning from the standby mode to the normal mode is avoided.

Next, when the load returns from the standby mode to the normal mode, the output voltage Vo falls because the load momentarily becomes heavy. As a result, the FB terminal voltage rises. When the FB terminal voltage exceeds the threshold voltage ref_sw for burst control, burst control enters a switching period.

When the FB terminal voltage rises further and exceeds the threshold ref2, a high-level signal fbcomp is inputted to the delay circuit 43. The delay circuit 43 outputs a high-level signal fbdelay with a delay of t1 after the input of the high-level signal fbcomp. Accordingly, at this time the standby detection circuit 37 outputs a low-level signal sdymo indicative of the normal mode. As a result, the LLC control IC 22 outputs a pulse signal having a frequency in the normal mode to the HO terminal and the LO terminal.

When the second converter 20 returns to the normal mode, a load current increases and the CA terminal voltage rises. When the CA terminal voltage exceeds the threshold ref1, the signal cacomp outputted by the comparator 42 becomes a high level. However, because at this time the delay circuit 43 outputs the high-level signal fbdelay, the signal sdymo outputted by the NOR circuit 44 remains at a low level.

After that the output voltage Vo rises. When the FB terminal voltage falls below the threshold ref2, the signal fbcomp outputted by the comparator 41 becomes a low level. Accordingly, the signal fbdelay outputted at this timing by the delay circuit 43 also becomes a low level. However, because at this time the signal cacomp outputted by the comparator 42 is at the high level, the signal sdymo outputted by the NOR circuit 44 remains at the low level.

With the standby detection circuit 37, as has been described, even when the CA terminal voltage is lower than the threshold ref1 and the FB terminal voltage transiently exceeds the threshold ref2, the signal sdymo is not switched to the normal mode. Only if a state in which the FB terminal voltage is higher than the threshold ref2 continues for a period longer than or equal to the delay time t1, the signal sdymo is switched to the normal mode. This avoids erroneously returning to the normal mode in the case of continuation of the standby mode being needed.

With the controller of the switching power supply apparatus having the above structure, even when a feedback signal transiently exceeds a second threshold at standby mode time, a signal outputted by the standby detection circuit is not switched to normal mode.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A controller of a current resonance switching power supply apparatus configured to supply a constant output voltage to a load, the current resonance switching power supply apparatus including
   a resonance circuit that has a resonance current, and
   a feedback signal generation circuit that generates a feedback signal indicative of an error between the output voltage of the current resonance switching power supply apparatus and a target voltage,
the controller comprising:
   a load current detection circuit which receives a part of the resonance current of the resonance circuit that is proportional to a load current, performs averaging, and outputs a load current signal indicative of the load current; and
   a standby detection circuit which includes
   a first comparator that has
     a first input terminal thereof receiving the load current signal,
     a second input terminal thereof receiving a first threshold, and
     a first output terminal thereof outputting a first result indicating whether the load current signal is lower than the first threshold,
   a second comparator that has
     a third input terminal thereof receiving the feedback signal,
     a fourth input terminal thereof receiving a second threshold, and
     a second output terminal thereof outputting a second result indicating whether the feedback signal is lower than the second threshold, a delay circuit that has
     a fifth input terminal thereof connected to the second output terminal of the second comparator, and a third output terminal thereof outputting a third result indicating whether the feedback signal has been higher than the second threshold for a predetermined time, and a logical sum circuit that has a sixth input terminal thereof connected to the third output terminal of the delay circuit to receive the third result, a seventh input terminal thereof connected to the first output terminal of the first comparator to receive the first result, and a fourth output terminal thereof outputting a signal indicating that the load is in the standby mode, when the received first result indicates that the load current signal is lower than the first threshold and the received third result indicates that the feedback signal has not been higher than the second threshold for the predetermined time, and in a normal mode, when the received third result indicates that that the feedback signal has been higher than the second threshold for more than the predetermined time.

2. The controller of the switching power supply apparatus according to claim 1, wherein the first and second input terminals of the first comparator are respectively a non-inverting input terminal and an inverting input terminal of the first comparator;

the third and fourth input terminals of the second comparator are respectively a non-inverting input terminal and an inverting input terminal of the second comparator;

and the logical sum circuit is a NOR circuit.

3. The controller of the switching power supply apparatus according to claim 2, wherein the delay circuit includes:

a resistor having a first terminal and a second terminal, the first terminal being connected to the input terminal of the delay circuit and receiving the output signal of the second comparator;

a capacitor having a first terminal and a second terminal, which are respectively connected to the second terminal of the resistor, and to a ground;

a third comparator having a non-inverting input terminal thereof connected to the second terminal of the resistor, and an inverting input terminal thereof receiving a reference voltage for determining a delay time;

an inverter circuit having an input terminal thereof connected to the first terminal of the resistor; and a switching element connected in parallel with the capacitor and configured to be turned on and off by an output signal of the inverter circuit.

4. The controller of the switching power supply apparatus according to claim 1, further comprising a control circuit which exercises a burst control upon receipt of a signal indicating that the load is in the standby mode from the standby detection circuit, the burst control including repeatedly alternating a predetermined switching period in which switching of the switching power supply apparatus is performed and a predetermined stop period in which the switching of the switching power supply apparatus is stopped.

5. The controller of the switching power supply apparatus according to claim 4, further comprising a soft start circuit which performs a soft start operation and a soft end operation at a switching beginning time and a switching end time, respectively, in the predetermined switching period during execution of the burst control by the control circuit.

6. The controller of the switching power supply apparatus according to claim 1, wherein the standby detection circuit determines that the load is in the standby mode, upon detecting that both the load current signal continues to be smaller than the first threshold for more than a third predetermined time that is smaller than the first predetermined time, and the feedback signal continues to be smaller than the second threshold for more than a fourth predetermined time that is smaller than the first predetermined time.

7. A controller of a current resonance switching power supply apparatus configured to supply a constant output voltage to a load, the current resonance switching power supply apparatus including a resonance circuit in which a resonance current flows, and a feedback signal generation circuit that generates a feedback signal indicative of an error between the output voltage of the current resonance switching power supply apparatus and a target voltage, the controller comprising:

a load current detection circuit which receives a part of the resonance current of the resonance circuit that is proportional to a load current, performs averaging, and outputs a load current signal indicative of the load current; and a standby detection circuit which receives the feedback signal and the load current signal, and determines that the load is in a standby mode, upon detecting that both the load current signal is lower than a first threshold and the feedback signal is lower than a second threshold, wherein the standby detection circuit receives the feedback signal and the load current signal, and determines that the load is in a normal mode, upon detecting that either the feedback signal continues to be higher than the second threshold for more than a first predetermined time, or the load current signal continues to be higher than the first threshold for more than a second predetermined time that is smaller than the first predetermined time.

\* \* \* \* \*